United States Patent
Hynes et al.

(10) Patent No.: US 11,132,684 B2
(45) Date of Patent: *Sep. 28, 2021

(54) METHODS AND SYSTEMS FOR VERIFYING INDIVIDUALS PRIOR TO BENEFITS DISTRIBUTION

(71) Applicant: MASTERCARD INTERNATIONAL INCORPORATED, Purchase, NY (US)

(72) Inventors: Ron Hynes, Ridgefield, CT (US); Sean Kirch, Mahwah, NJ (US); Jennifer Dogin, Mamaroneck, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 172 days.

This patent is subject to a terminal disclaimer.

(21) Appl. No.: 16/535,459

(22) Filed: Aug. 8, 2019

(65) Prior Publication Data

US 2019/0362360 A1    Nov. 28, 2019

Related U.S. Application Data

(63) Continuation of application No. 14/264,136, filed on Apr. 29, 2014, now Pat. No. 10,410,216.

(51) Int. Cl.
*G06Q 20/10* (2012.01)
*G06Q 20/40* (2012.01)

(52) U.S. Cl.
CPC ....... *G06Q 20/40145* (2013.01); *G06Q 20/10* (2013.01)

(58) Field of Classification Search
None
See application file for complete search history.

(56) References Cited

U.S. PATENT DOCUMENTS

| 4,582,985 A | 4/1986 | Lofberg |
| 5,623,552 A | 4/1997 | Lane |

(Continued)

FOREIGN PATENT DOCUMENTS

| JP | 11-025246 | 1/1999 |
| JP | 2000-250861 | 9/2000 |

(Continued)

OTHER PUBLICATIONS

Ron White, How Computers Work, Oct. 15, 2003, Paul Boger, Illustrated by Timothy Edward Downs, 7th Edition (Year: 2003); 23 pgs.

(Continued)

*Primary Examiner* — Narayanswamy Subramanian
(74) *Attorney, Agent, or Firm* — Harness, Dickey & Pierce, P.L.C.

(57) ABSTRACT

Systems and methods for verifying individuals prior to distribution of one or more benefits are disclosed. One exemplary method includes receiving, at a server, a proof-of-life validation from a payment service provider. The proof-of-life validation is based on receipt of a valid biometric from the individual at a payment device associated with the individual, and a transaction using said payment device. The method further includes distributing the benefit to a benefit account associated with the individual, when the proof-of-life validation is received within a time interval of the benefit distribution date.

20 Claims, 3 Drawing Sheets

(56) References Cited

U.S. PATENT DOCUMENTS

| | | | |
|---|---|---|---|
| 5,712,473 | A | 1/1998 | Nagashio |
| 5,748,737 | A | 5/1998 | Daggar |
| 5,801,367 | A | 9/1998 | Asplund et al. |
| 6,208,264 | B1 | 3/2001 | Bradney et al. |
| 6,213,403 | B1 | 4/2001 | Bates, III |
| 6,325,285 | B1 | 12/2001 | Baratelli |
| 6,360,953 | B1 | 3/2002 | Lin et al. |
| 6,494,380 | B2 | 12/2002 | Jarosz |
| 6,547,130 | B1 | 4/2003 | Shen |
| 6,592,031 | B1 | 7/2003 | Klatt |
| 6,624,739 | B1 | 9/2003 | Stobbe |
| 6,826,537 | B1 | 11/2004 | Wood et al. |
| H002120 | H | 7/2005 | Cudlitz |
| 6,954,133 | B2 | 10/2005 | McGregor et al. |
| 7,028,893 | B2 | 4/2006 | Goodman et al. |
| 7,044,368 | B1 | 5/2006 | Barron |
| 7,155,416 | B2 | 12/2006 | Shatford |
| 7,997,477 | B2 | 8/2011 | Robinson |
| 8,103,528 | B2 | 1/2012 | Read et al. |
| 9,813,236 | B2 | 11/2017 | Buer |
| 10,410,216 | B2 * | 9/2019 | Hynes .............. G06Q 20/40145 |
| 10,853,807 | B2 * | 12/2020 | Huang ................. G07F 19/207 |
| 11,042,719 | B2 * | 6/2021 | Rodriguez ......... G06Q 20/3672 |
| 2001/0008004 | A1 | 7/2001 | Jarosz |
| 2002/0180584 | A1 | 12/2002 | McGregor et al. |
| 2004/0204951 | A1 | 10/2004 | Wood et al. |
| 2005/0137977 | A1 | 6/2005 | Wankmueller |
| 2006/0000892 | A1 | 1/2006 | Bonalle et al. |
| 2006/0064380 | A1 | 3/2006 | Zukerman |
| 2006/0095369 | A1 | 5/2006 | Hofi |
| 2006/0107067 | A1 | 5/2006 | Safal et al. |
| 2007/0073619 | A1 | 3/2007 | Smith |
| 2007/0101413 | A1 | 5/2007 | Vishik et al. |
| 2008/0091576 | A1 | 4/2008 | Teelock et al. |
| 2008/0217398 | A1 | 9/2008 | Woo |
| 2008/0222720 | A1 | 9/2008 | Sines |
| 2009/0076966 | A1 | 3/2009 | Bishop et al. |
| 2009/0084858 | A1 | 4/2009 | Borracci |
| 2009/0143104 | A1 | 6/2009 | Lph et al. |
| 2009/0204441 | A1 | 8/2009 | Read et al. |
| 2010/0153722 | A1 | 6/2010 | Bauchot et al. |
| 2012/0218074 | A1 | 8/2012 | Luckhardt |
| 2012/0228375 | A1 | 9/2012 | Iwaloye |
| 2012/0233074 | A1 | 9/2012 | Dangott et al. |
| 2012/0330765 | A1 | 12/2012 | Fried et al. |
| 2013/0159194 | A1 | 6/2013 | Habib |
| 2013/0307670 | A1 | 11/2013 | Ramaci |
| 2014/0025583 | A1 | 1/2014 | McNeal |
| 2014/0046838 | A1 | 2/2014 | Dogin et al. |
| 2014/0239065 | A1 | 8/2014 | Zhou et al. |
| 2014/0339315 | A1 | 11/2014 | Ko |
| 2015/0170112 | A1 | 6/2015 | DeCastro |
| 2015/0310440 | A1 | 10/2015 | Hynes et al. |
| 2016/0364703 | A1 | 12/2016 | Bhatt et al. |
| 2016/0364730 | A1 | 12/2016 | Rans et al. |

FOREIGN PATENT DOCUMENTS

| | | |
|---|---|---|
| JP | 2003-208553 | 7/2003 |
| JP | 2006-119811 | 5/2006 |
| JP | 2006-172158 | 6/2006 |
| JP | 5713516 B | 3/2015 |
| KR | 10-2012-0009931 | 2/2012 |

OTHER PUBLICATIONS

EMVCO: "EMV2000 Integrated Circuit Card Specification for Payment Systems, Book 3—Application Specification", Internet Citation, Dec. 2000, XP02319756, Retrieved from the internet (Mar. 2, 2005): http://www.emvco.com/specifications.cfm; 164 pgs.

* cited by examiner

METHODS AND SYSTEMS FOR VERIFYING INDIVIDUALS PRIOR TO BENEFITS DISTRIBUTION

CROSS-REFERENCE TO RELATED APPLICATION

This application is a continuation of U.S. patent application Ser. No. 14/264,136 filed on Apr. 29, 2014. The entire disclosure of the above application is incorporated herein by reference.

FIELD

The present disclosure relates to methods and systems for verifying individuals, for example, prior to distribution of one or more benefits to the individuals.

BACKGROUND

This section provides background information related to the present disclosure which is not necessarily prior art.

Payment cards are often used by individuals in financial transactions such as, for example, the purchase of goods and/or services from merchants, etc. Payment service providers help facilitate the transactions by approving the transactions, providing authorization for the transactions, etc.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

Benefits are often provided (e.g., distributed, disbursed, paid, etc.) to individuals by administrators of the benefits. The benefits may include any one or more desired benefits, such as monetary-based benefits (e.g., social security benefits, pension benefits, retirement benefits, unemployment benefits, etc.) and service-based benefits (e.g., health care services, income subsidies, etc.). And, the administrators may include any suitable entities, such as governments, businesses, individuals, etc. responsible for distributing the benefits. In addition, the benefits may include one-time distributions, for example, made on particular benefit distribution dates, or they may include repeat distributions cyclically made on particular benefit distribution dates (e.g., monthly distributions, etc.). Further, in some cases, the benefits may be provided to the individuals, by the administrators, only if the individuals are living. Here, the benefits may expire or terminate when the individuals pass away.

Systems and methods are provided herein in which payment devices are used, in connection with payment systems, to verify individuals prior to distribution of benefits, by administrators, to the individuals. In the exemplary systems and methods, the payment devices are first configured to read biometrics of the individuals and validate the individuals (locally on the payment devices). The validations of individuals are included in transaction data associated with transactions by the payment devices. Payment service providers identify the validations and communicate the validations to the administrators of the benefits. And, the administrators, in turn, use the validations to ensure that the benefits are distributed only to verified individuals. This can help ensure that the benefits are distributed only to the correct and living individuals.

Figure 1:
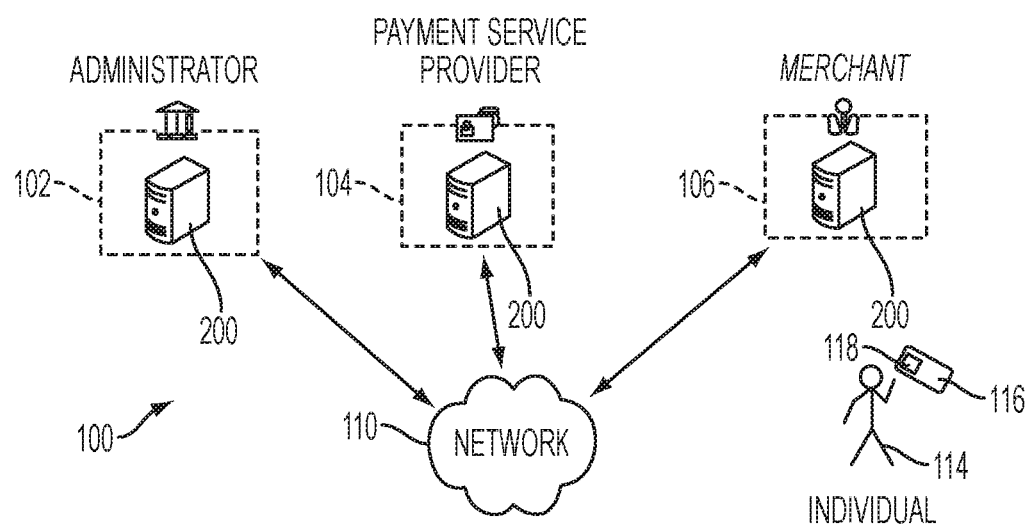
FIG. 1 is a block diagram of an exemplary system of the present disclosure suitable for use in verifying an individual prior to distribution of one or more benefits for the individual.

With reference now to the drawings, FIG. 1 illustrates an exemplary system 100, in which one or more aspects of the present disclosure may be implemented. Although components of the system 100 are presented in one arrangement, it should be appreciated that other exemplary embodiments may include the same or different components arranged otherwise, for example, depending on verification processes for individuals, authorization processes for payment device transactions, communication means between payment service providers and administrators of benefits, etc.

The illustrated system 100 generally includes an administrator 102 of benefits, a payment service provider 104, and a merchant 106 (e.g., a physical store (e.g., using a point of sale (POS) reader, etc.), an internet-based merchant (e.g., using a chip authentication program (CAP) reader, etc.), an automated teller machine, etc.), each coupled to network 110. The network 110 may include, without limitation, one or more local area networks (LAN), wide area networks (WAN) (e.g., the Internet, etc.), mobile networks, virtual networks, other networks as described herein, and/or other suitable public and/or private networks capable of supporting communication among two or more of the illustrated components, or any combination thereof. In one example, the network 110 includes multiple networks, where different ones of the multiple networks are accessible to different ones of the illustrated components in FIG. 1. In addition, each of the administrator 102, the payment service provider 104, and the merchant 106 includes a computing device 200 (e.g., a server, a computer, etc.) coupled to the network 110. Each computing device 200 may include a single computing device, or multiple computing devices located together or distributed across a geographic region. Further, each computing device 200 may be coupled to a network (e.g., the Internet, an intranet, a private or public LAN, WAN, mobile network, virtual network, or other suitable network, etc.) that is either part of the network 110 (e.g., capable of supporting communication between the computing device 200 and the network 110, etc.), or separate therefrom.

In the illustrated system 100, the administrator 102 is responsible for distributing a benefit (e.g., a monetary-based benefit, a service-based benefit, etc.) to an individual 114 on a benefit distribution date (e.g., as determined by the administrator, etc.). In so doing, the administrator 102 initially identifies the individual 114 for receiving the benefit, and then preliminarily confirms identity and status (e.g., proof-of-life, age, residence, etc.) of the individual 114 to ensure that the individual 114 is in fact the proper individual to receive the benefit. In some aspects, this includes a requirement, by the administrator 102, for the individual 114 to contact a benefit office, in person, where the identity and the status of the individual 114 are confirmed. A payment device 116 is then also issued to the individual 114 at the benefit office, and biometric data from the individual 114 is recorded onto the payment device 116, by the administrator 102 or an entity associated with the administrator 102, to ensure the proper individual is matched with the payment device 116.

As described more hereinafter, it will be necessary for the individual 114 to validate himself/herself, using a biometric reader 118 (e.g., a fingerprint scanner, a retina scanner, a voice recognition reader, etc.), within a predetermined time period (or time interval) of the benefit distribution date in order to receive the benefit (and then repeatedly do so thereafter for subsequent distribution dates to receive further benefits, if applicable). The benefit distribution date can include any desired date, and may include the particular date the benefit is to be distributed by the administrator 102 to the individual 114, or may include an earlier date on which the benefit is prepared for distribution (which may be a date that is prior to the actual date the benefit is distributed, in order to provide processing time for the benefit distribution). And, the predetermined time interval may be any desired time period prior to the benefit distribution date, for example, a calendar month, a time (e.g., a benefit cycle, etc.) between two consecutive benefit distribution dates (when the benefit includes repeat benefits), a predetermined number of days before the benefit distribution date (e.g., 5 days, 1 week, 2 week, a month, etc.).

In the illustrated embodiment, the biometric reader 118 is provided on the payment device 116, for capturing a biometric from the individual 114 (for use in validating the individual 114). In other exemplary embodiments, the biometric reader 118 may instead be provided with a POS terminal, for example, at the merchant 106, or otherwise associated with the payment device 116. Here, the biometric reader 118 is integrated with the payment device 116, and captures the biometric from the individual, when the individual uses the payment device 116 at the POS terminal.

The payment device 116 issued to the individual 114 typically includes account data for the individual 114, so that the payment device 116 can be used by the individual 114, for example, with the merchant 106 to purchase desired goods, services, etc. For example, the individual 114 can initiate a transaction by presenting the payment device 116 to the merchant 106 (and, in some cases, entering a personal identification number (PIN) associated with the payment device 116 or capturing a biometric associated with the individual 114). The merchant 106 reads the payment device 116 and communicates, via the network 110, an authorization request, including an account number (and any other necessary account data included on the payment device 116) and an amount of the transaction, to the payment service provider 104, via one or more acquirer banks (not shown). The payment service provider 104, in turn, passes the authorization request to the issuer (not shown) for authorization to complete the transaction. The transaction is then completed upon receipt, by the merchant 106, of authorization (or rejection) from the issuer.

In the illustrated embodiment, the payment device 116 is also associated with a benefit account for the individual 114 so that the benefit can be distributed, by the administrator 102, to the appropriate account on the benefit distribution date. As such, when the individual 114 has been validated on the payment device 116 (using the biometric reader 118) and then also initiates the transaction with the merchant 106, both within the predetermined time period of the benefit distribution date, the merchant 106 not only communicates the account number and the amount of the purchase to the payment service provider 104, via the network 110, but also the validation (all as part of the transaction data). Then, upon identifying the validation, as part of the transaction data received from the merchant 106, the payment service provider 104 communicates it, via the network 110, to the administrator 102. The administrator 102 can then determine if the validation is timely, and distribute the benefit to the verified individual 114 at the appropriate time, for example, through the benefit account associated with the payment device 116.

It should be appreciated that the payment device 116 may include any suitable payment device 116 within the scope of the present disclosure, for example, credit cards, debit cards, pre-paid cards, payment tokens, payment tags, passes, fobs, stickers, or other enabled devices suitable to provide payment information (e.g., mobile phones, tablets, etc.), etc. In one example, the payment device 300 is an EMV (Europay, MasterCard and Visa) enabled device (e.g., a payment device 118 with an EMV chip, etc.). It should be appreciated that the payment device 116 may be any of a variety of different devices and may communicate to a POS terminal, directly, or indirectly (e., the Internet), in a variety of suitable manners, including, for example, a magnetic card swipe, Bluetooth communication, near field communication (NFC), etc.

In addition, while the biometric reader 118 is integrated with the payment device 116 in FIG. 1, in other exemplary embodiments biometric readers may be associated differently with the payment devices, for example, removably coupled to the payment devices (e.g., as a removable biometric reader dongle, etc.), or associated with POS terminals, etc. For example, in one embodiment, the biometric reader 118 is provided on a POS terminal at the merchant 106, and the payment device 116 includes an EMV chip (and no biometric reader). Here, the individual 114 provides a biometric using the biometric reader 118 on the POS terminal, which then communicates the biometric to the payment device 116 for comparison to a reference biometric on the EMV chip. When the biometrics match, the EMV chip permits transactions to be completed using the payment device 116, in which the EMV chip communicates to the POS terminal that the individual 114 is valid. The transaction data communicated from the POS terminal to the payment service provider 104 includes a confirmation that the individual 114 is valid (along with a date the validation was given).

Figure 2:
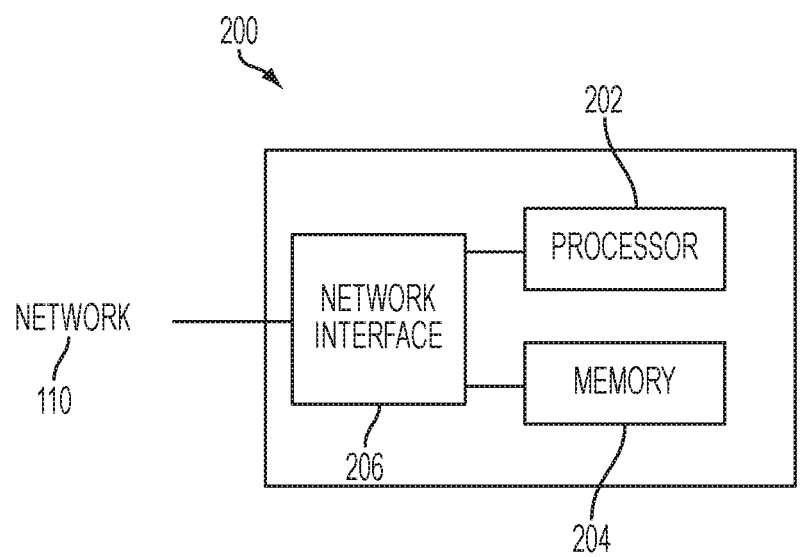
FIG. 2 is a block diagram of an exemplary computing device, that may be used in the system of FIG. 1.

FIG. 2 illustrates an exemplary computing device 200. For purposes of the description herein, each computing device 200 shown in FIG. 1 is a computing device, consistent with computing device 200. However, it should be appreciated that each computing device 200 of FIG. 1 should not be understood to be limited to the arrangement of the computing device 200, as depicted in FIG. 2. Different components and/or arrangements of components may be used in other computing devices. In addition, in various exemplary embodiments the computing device 200 may include multiple computing devices located in close proximity, or distributed over a geographic region.

The exemplary computing device 200 includes a processor 202 and a memory 204 that is coupled to the processor 202. The processor 202 may include one or more processing units (e.g., in a multi-core configuration, etc.). The computing device 200 is programmable to perform one or more operations described herein by programming the processor 202 and/or the memory 204. The processor 202 may include, but is not limited to, a general purpose central processing unit (CPU), a microcontroller, a reduced instruction set computer (RISC) processor, an application specific integrated circuit (ASIC), a programmable logic circuit (PLC), a gate array, and/or any other circuit or processor capable of the functions described herein. The above examples are exemplary only, and thus are not intended to limit in any way the definition and/or meaning of processor.

The memory 204, as described herein, is one or more devices that enable information, such as executable instructions and/or other data, to be stored and retrieved. The memory 204 may include one or more computer-readable media, such as, without limitation, dynamic random access memory (DRAM), static random access memory (SRAM), read only memory (ROM), solid state devices (e.g., an EMV chip, etc.), and/or hard disks. The memory 204 may be configured to store, without limitation, financial account data for the individual 114, benefit account data for the individual 114, transaction data for various transactions, etc.

The illustrated computing device 200 also includes a network interface 206 coupled to the processor 202 and the memory 204. The network interface 206 may include, without limitation, a wired network adapter, a wireless network adapter, a mobile telecommunications adapter, or other device capable of communicating to one or more different networks, including the network 110. In some exemplary embodiments, the computing device 200 includes the processor 202 and one or more network interfaces incorporated into or with the processor 202. Furthermore, in various embodiments, computer-executable instructions may be stored in the memory 204 for execution by the processor 202 to perform one or more of the functions described herein, such that the memory 204 is a physical, tangible, and non-transitory computer-readable media. It should be appreciated that the memory 204 may include a variety of different memories, each implemented in one or more of the functions or processes described herein.

In some exemplary embodiments, the computing device 200 may also include a display device and/or an input device coupled to the processor 202. The display device may be configured to output information and/or data to a user by, for example, displaying and/or otherwise outputting the information and/or data. The display device may include, without limitation, a cathode ray tube (CRT), a liquid crystal display (LCD), a light-emitting diode (LED) display, an organic LED (OLED) display, and/or an "electronic ink" display. In addition, the display device may include multiple devices. The input device may be configured to receive input from a user, and may include, without limitation, a keyboard, a pointing device, a mouse, a stylus, a touch sensitive panel (e.g., a touch pad or a touch screen, etc.), and/or an audio input device. In some exemplary embodiments, a touch screen, such as that included in a tablet or similar device, may function as both a display device and an input device.

In some exemplary embodiments, computer-executable instructions are stored on non-transitory memory associated with the computing device 200 for execution by the processor 202 to perform one or more of the functions described herein. These instructions may be embodied in a variety of different physical or tangible computer-readable media, such as the memory 204 or other non-transitory memory, such as, without limitation, a flash drive, CD-ROM, thumb drive, floppy disk, etc. Computer-readable media may be selectively insertable to and/or removable from the computing device 200 to permit access to and/or execution by the processor 202. In one example, computer-readable media includes a separate optical or magnetic disc that is inserted or placed into an input device associated with the processor 202 and/or the memory 204. In some instances, however, the computer-readable media may not be insertable/removable.

Figure 3:
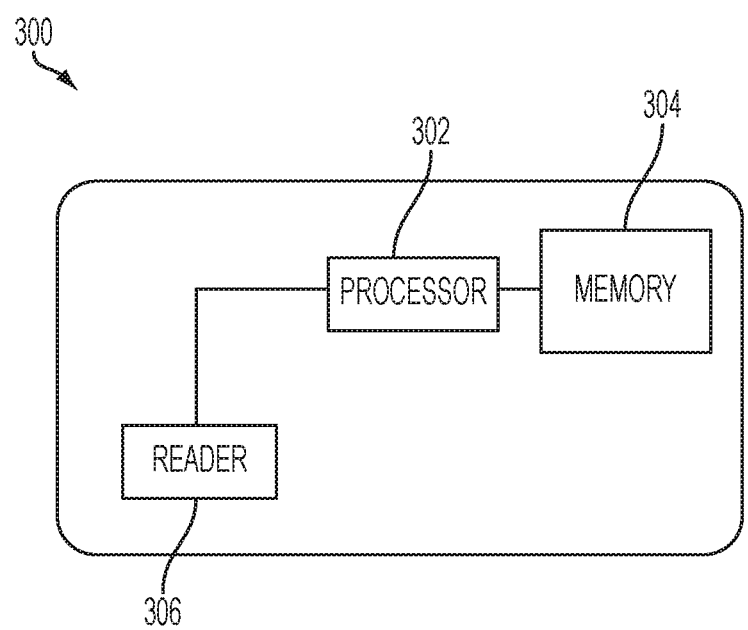
FIG. 3 is a block diagram of an exemplary payment device, that may be used in the system of FIG. 1.

FIG. 3 illustrates an exemplary payment device 300. The payment device 300 may include a credit card, a debit card, a pre-paid card, or other card within the scope of the present disclosure. For purposes of the description herein, the payment device 116 shown in FIG. 1 may be a payment device consistent with the payment device 300. However, it should be appreciated that the payment device 116 of FIG. 1 should not be understood to be limited to the payment device 300, as depicted in FIG. 3, as different payment devices may be used, including payment tokens, payment tags, passes, other enabled devices used to provide account numbers (e.g., mobile phones, tablets, etc.), etc.

The illustrated payment device 300 includes a processor 302 and a memory 304 that is coupled to the processor 302. In addition, a power source (e.g., a capacitor, a battery, etc.) is provided to power the processor 302 and memory 304, as needed. It should be appreciated that the processor 302 can include one or more suitable processing units, such as described above, and the memory 304 can include any suitable devices, such as described above, that enable the functions described herein.

The payment device 300 is suitable to be used by an individual to complete transactions, such as the purchase of goods, services, etc. (e.g., at the merchant 106 using a POS terminal, etc.). In addition, the payment device 300 is configured to locally validate an individual (e.g., the individual 114, etc.) using the payment device 300 (e.g., the validation occurs on the payment device 300, etc.). The processor 302 and/or the memory 304 of the payment device 300 can be programmed (e.g., can include one or more operating systems configured, etc.) to set a biometric status. For example, the illustrated payment device 300 includes an interface peripheral 306 (e.g., a fingerprint reader, etc.) disposed on the payment device 300 and configured to receive a biometric from an individual using the payment device 300. The processor 302 is then configured to compare the received biometric, from the peripheral 306, to a biometric previously recorded and stored in the memory 304 on the payment device 300, i.e., a reference biometric. The comparison takes place on the payment device 300. When the received biometric matches the reference biometric (i.e., is a valid biometric), the processor 302 is then configured to set a biometric status (e.g., a validation bit or digit, etc.) on the payment device 300 for the individual 114.

Further, in this embodiment, when the individual 114 is validated, the payment device 300 is configured to set the biometric status in the memory 304 for an expiration interval, after which the status expires (or resets). As an example, the biometric status may be reset according to a timer or after a time interval (e.g., 1 minutes, 5 minutes, 1 hour, etc.), or may be reset based on proximity of the payment device to a POS terminal, or reset based on the loss of power to the payment device 116, or disassociation of the payment device 116 from a POS terminal. In one example, the expiration interval is defined as a predetermined date, or a date relative of a distribution date for the benefit, in memory 204 (e.g., the 20th day of each month, etc.). Any suitable timer or calendar may be used to track the time period, for example, a resistor/capacitor circuit, a clock, etc. To avoid reset, the individual provides his/her biometric to the payment device 300, for validation within the expiration interval.

Then, when the payment device 300, where the biometric status is set in memory 304, is used in a transaction (e.g., at the merchant 106, etc.), the set biometric status is sent as part of the transaction data (e.g., via network 110, etc.) to the payment service provider 104. In some aspects of the present disclosure, it is contemplated that validation of a biometric stored in the memory 304 of the device 300 (e.g., on an EMV chip, etc.) is required to enable the payment device to make a transaction. Further, the biometric status set in the memory 304 may only last a short period of time, such that the validation must take place at the time of the transaction. Here, following such validation, the processor 302 of the payment device 300 communicates, for example, to the POS terminal at the merchant 106, that the individual 114 using the payment device 300 is in fact the correct person. The POS terminal records that the payment device has been "self validated" and thus the individual 114 who is making the transaction is not only the correct person, but is also alive since he/she is purchasing something at the merchant 106.

In cases where the individual 114 receives a benefit from the administrator 102, in each benefit cycle (e.g., monthly, etc.) on a benefit distribution date, the individual 114 will need to be repeatedly validated, using the payment device 300, within the expiration interval, whether linked to the benefit distribution date or not (and then also use the payment device 300 in a transaction within the predetermined time interval). In this manner, the set biometric status can be sent to the payment service provider 104 and administrator 102 during each benefit cycle to validate the individual 114 is still alive.

While the illustrated payment device 300 includes a power source configured to provide power to the payment device 300 (e.g., independent of card readers, etc.), it should be appreciated that in other exemplary embodiments payment devices may not include such power sources and may need to be inserted into card readers to provide power. In such examples, individuals using the payment devices may be validated when the payment devices are inserted in the card readers. In addition, in other exemplary embodiments, payment devices may include processors that continuously check for validations and, when validations are not found, prompt individuals using the payment devices for such validations (e.g., via indicators on the payment devices, indicators at point of sale readers, etc.).

Figure 4:
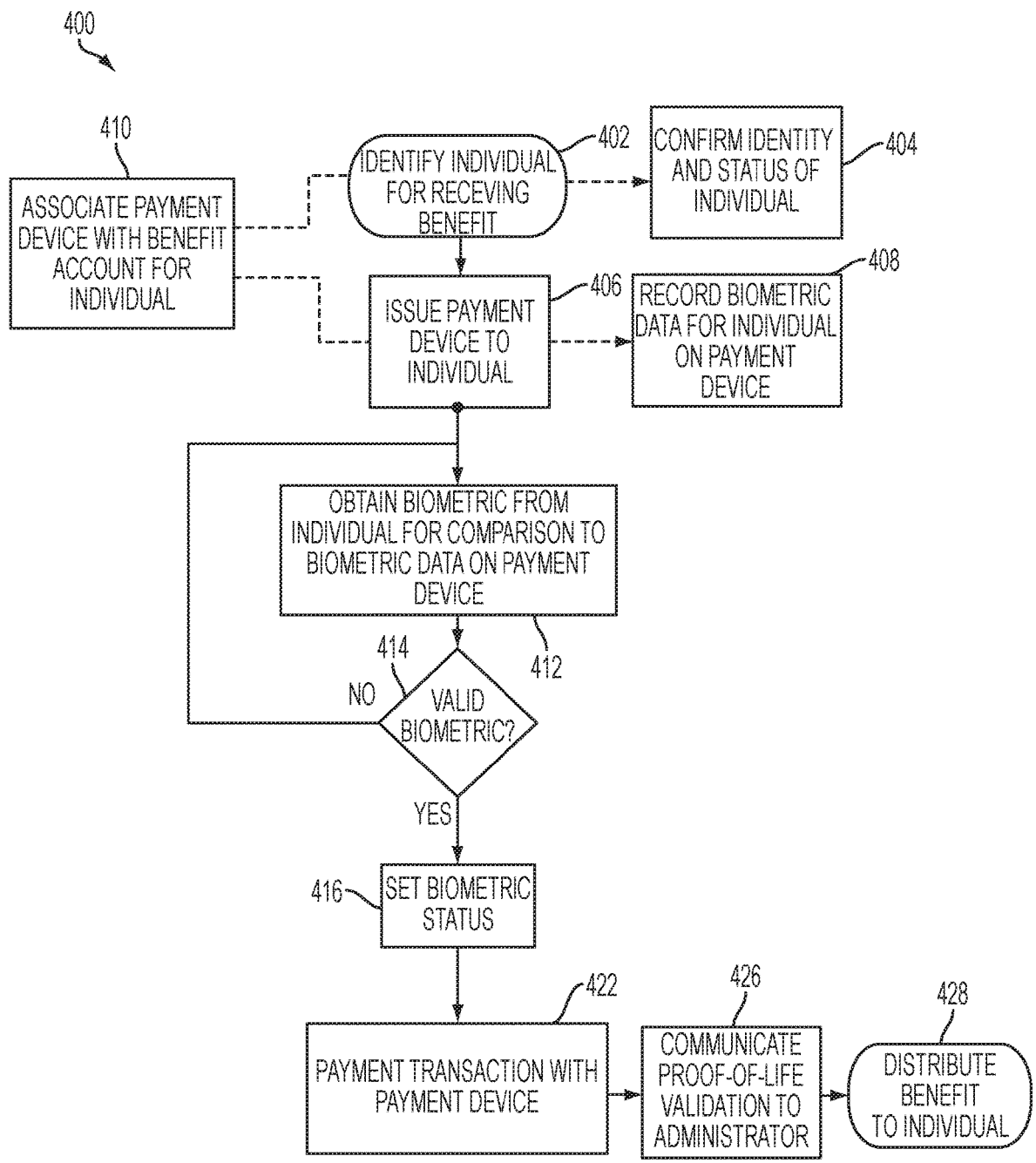
FIG. 4 is an exemplary method of verifying an individual prior to distribution of one or more benefits for the individual.

FIG. 4 illustrates an exemplary method 400 of verifying an individual (e.g., the individual 114, etc.) prior to effecting a benefit distribution to the individual 114. The method 400 is described below in connection with the exemplary system 100, the exemplary computing device 200, and the exemplary payment device 300 previously described. However, it should be appreciated that the method 400 is not limited to the system 100, or the computing device 200, or the payment device 300 but may be implemented in a variety of different systems and/or computing devices and/or payment devices. Likewise, the systems, computing devices, and payment devices described herein should not be understood to be limited to the exemplary method 400, or other methods described herein.

In the illustrated method 400, the administrator 102 distributes a benefit (e.g., a monetary-based benefit, a service-based benefit, etc.) to the individual 114 on a benefit distribution date, if the individual 114 is alive. The benefit may be a one-time benefit, distributed on the benefit distribution date. Or, the benefit may include benefits distributed cyclically, each on a benefit distribution date (e.g., a benefit distributed once a month on the same date of the month, etc.). In connection with the benefit in either case, the method 400 allows for verifying that the individual 114 is alive, prior to distributing the benefit to the individual 114.

The administrator 102 initially identifies the individual 114 for receiving the benefit, at 402, which includes confirming identity and status (e.g., proof-of-life, age, residence, etc.) of the individual 114, at 404, to ensure that the individual 114 is in fact the proper individual 114 to receive the benefit. This may also include a requirement, by the administrator 102, for the individual 114 to contact a benefit office, in person, to perform the confirmation. Next, the administrator 102 issues the payment device 300 to the individual 114, at 406. This includes recording and storing biometric data (e.g., fingerprint data, etc.) for the individual 114, locally, in the memory 304 on the payment device 300, at 408. As such, the biometric data is specific/particular to the payment device 300 (as opposed to being stored with biometric data for other individuals in a central repository, etc.). As an example, the biometric data may be collected from an individual 114, using a computing device (e.g., a finger print scanner, etc.), and then transferred from the computing device to the memory 304 on the payment device 300. The reference biometric provides a basis for comparison, locally on the payment device 300 (e.g., by the processor 302, etc.), of a later collected biometric (e.g., a fingerprint, etc.) when subsequently validating the individual 114 using the payment device 300. In other exemplary embodiments, the payment service provider 104 or other entity (e.g., an entity other than the administrator 102, etc.) may issue the payment device 300 to the individual 114, at 406, and/or record the biometric data from the individual 114 for storing in the memory 304 on the payment device 300, at 408.

The payment device 300 issued to the individual 114 includes account data for the individual 114, which allows the individual 114 to use the payment device 300 to purchase desired goods, services, etc. In addition, as part of the method 400, the payment device 300 is also associated with a benefit account (and also includes benefit account data as part of the payment card data stored in the memory 304 and/or the processor 302) for the individual 114, at 410, so that future action on the payment device 300 can be correlated to the individual's benefit account. These account associations can be done at any time, for example, before the payment device 300 is issued to the individual 114, at about the same time the payment device 300 is issued to the individual 114 (e.g., in parallel with assigning the payment device 300 to the individual 114, etc.), or even after the payment device 300 is issued to the individual 114 (as illustrated in FIG. 4).

Once the payment device 300 is issued to the individual 114, the individual 114 must take certain actions within a predetermined time interval of the benefit distribution date in order to receive the benefit. For example, in the illustrated method 400, before the payment device 300 can even be used, a biometric is first obtained from the individual 114, at 412 (e.g., using the peripheral 306 (e.g., a fingerprint scanner, etc.) of the payment device 300, using a biometric reader at a POS terminal, etc.), and compared, at 414, directly on the payment device 300 by the processor 302 to the biometric data previously stored on the payment device 300 in the memory 304. If the received biometric matches the biometric data stored on the payment device 300 (e.g., if the biometric is valid, etc.), the payment device 300 sets a biometric status for the individual 114 in the memory 304 of the payment device 300, at 416. The biometric status may be valid for a particular time period (e.g., 1 minute, 5 minutes, 1 hour, etc.) (where the payment device 300 may then determine if an expiration interval, since the biometric status was last set, has expired and the resets the status as appropriate). Or, the biometric status may be valid only if the payment device is within a particular proximity to a POS terminal.

After providing a biometric to the payment device 300, the payment device 300 is used by the individual 114 for a transaction at the merchant 106, at 422. The transaction, using the payment device 300, includes the merchant 106 sending an authorization request, via the network 110, for the transaction to the payment service provider 104, via one or more acquirers (not shown). The authorization request includes the biometric status (but not any of the individual's actual biometric data). As an example, if the payment device 300 is used with a POS terminal at the merchant 106 for the transaction, the POS terminal receives the biometric status information from the memory 304 (e.g., from an EMV chip, etc.) on the payment device 300 (e.g., in the same fashion the POS terminal gets a payment card number from the payment device, etc.), and includes the biometric status in a predefined field (e.g., as a "y", as a "1", etc.) in the authorization request. The authorization request then carries the biometric status information to the network 110, and the payment service provider 104.

However, if the payment device 300 is not properly used by the individual 114 in a transaction after the biometric status is set, the biometric status will be reset by the processor 302 and/or memory 304 of the payment device 300. Additional validation may be required, in certain embodiments, by the individual 114 to subsequently use the payment device 300. As can be seen, in the illustrated method 400, the individual 114 must both validate himself/ herself on the payment device 300 and, once validated, complete a transaction using the payment device 300, before the biometric status expires to provide proof-of-life through the transaction.

Finally, upon receiving the authorization request (as part of a transaction) from the merchant 106 (at the computing device 200), the payment service provider 104 screens the authorization request for the set biometric status. If the payment service provider 104 identifies that the authorization request includes the biometric status, which is set, the payment service provider 104 communicates a proof-of-life validation, at 426, to the administrator 102 (where it is received at the computing device 200 (e.g., a server, etc.) associated with the administrator 102). As part of this communication, the payment service provider 104 also communicates the benefit account data associated with the payment device 300 to the administrator 102, so that the appropriate individual 114 and benefit account can be identified by the administrator 102. The administrator 102 can then identify the verified individual 114 and distribute the benefit, at 428. It should be appreciated that, even if the transaction using the payment device 300 is declined, the proof-of-life validation will be communicated to the administrator 102 as long as the biometric status is set.

In various embodiments, the payment device 300 may be used routinely by the individual 114, whether linked to the benefit account or another account. Consequently, authorization requests for the transactions may routinely contain a set biometric status, for the individual 114. As such, the payment service provider 104 may limit the number of communications to the benefits administrator 102 to only once per validation interval. The validation interval may be any interval suitable to permit validation to be communicated to the administrator 102, to help in the timely distribution of benefits, but possibly limited to avoid burdensome and/or unnecessary communications to the benefits administrator 102. For example, a validation interval may be the benefit cycle for a particular benefit, or a number of days (e.g., 5 days, 10 days, 2 weeks, 15 days, etc.). It should be appreciated that in some embodiments, the administrator 102 may determine to receive proof-of-life validation, whenever available, regardless of the number received per individual, per benefit cycle.

Further, in various embodiments, the payment device 300 may be used regardless of whether or not the biometric status is set (e.g., as a typical payment device, etc.).

It should be appreciated that, in some embodiments, the biometric indicator is active up to the benefit distribution date. After this date, the status expires, or is reset. In cases where the benefit includes repeated, or cyclical, distributions to the individual 114, for example, each on a particular benefit distribution date where the benefit distribution dates are separated by a benefit cycle, the method 400 is repeated for each benefit distribution.

In some exemplary embodiments, the benefit account is linked to the payment device 300 so that the benefit, distributed by the administrator 102, can be used through the payment device 300, for example, in a payment transaction, etc. In other exemplary embodiments, the benefit account is separate from the payment device 300, such that the benefit distributed to the benefit account, by the administrator 102, cannot be used through the payment device 300. Further, the payment transaction required to communicate the biometric indicator to the payment service provider 104 may include any transaction, for example, a point-of-sale transaction for goods, services, etc. at the merchant 106, a return to the merchant 106, or a zero value transaction at the merchant 106 (e.g., where the merchant 106 includes an ATM, etc.). Thus, the individual 114 is not necessarily required to make a purchase, or spend money, in order to communicate the biometric indicator to the payment service provider 104. The individual 114 simply must access the payment network and transmit the biometric indicator.

In some exemplary embodiments, one or more of the administrator 102, the payment service provider 104, the merchant 106, or other entity may communicate one or more reminder to the individual 114 to remind the individual 114 to complete the necessary validation operations on the payment device 300 a number of days before the distribution date (e.g., 1 month, 2 weeks, 1 week, 5 days, etc.), and/or on a day before or within the time period of the distribution date. This can help remind the individual 114 and ensure that the individual 114 is verified in time, so that the benefit may be distributed without delay and/or not unintentional withheld from the individual 114.

It should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following steps: (a) receiving, at a server, a proof-of-life validation from a payment service provider, the proof-of-life validation based on receipt of a valid biometric from the individual at a payment device associated with the individual, and a transaction using said payment device, (b) distributing the benefit to a benefit account associated with the individual, when the proof-of-life validation is received within a time interval of the distribution date, (c) receiving, at a server, an authorization request for a transaction to a payment account, the payment account associated with a payment device, the authorization request including a biometric status, and (d) communicating, to an administrator of the benefit, a proof-of-life validation when the biometric status is set, indicating the individual presented a valid biometric to the payment device within an expiration interval.

With that said, exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," "coupled to," or "included with" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method of verifying an individual prior to distribution of a benefit for the individual, the method comprising:

receiving, at a server, an authorization request for a payment account transaction between an individual and a merchant, the payment account transaction involving a payment device associated with the individual;

identifying, by the server, a biometric status as being set in the authorization request, the biometric status indicative of the payment account transaction being initiated by the individual within an expiration interval of a match between a biometric received from the individual at the payment device and a reference biometric stored in the payment device, the authorization request not including actual biometric data of the individual;

extracting, by the server, from the authorization request having the set biometric status, benefit account data for the individual;

identifying, by the server, an administrator of a benefit associated with the individual based on the extracted benefit account data; and transmitting, by the server, a proof-of-life validation for the individual to the identified administrator of the benefit, thereby indicating to the administrator that the individual presented a valid biometric to the payment device and initiated the payment account transaction within the expiration interval, and whereby the administrator identifies the individual based on the benefit account data and relies on the proof-of-life validation to distribute the benefit for the individual.

2. The computer-implemented method of claim 1, wherein the payment account transaction is directed to a payment account associated with the payment device; and wherein the benefit account data includes a benefit account associated with the individual and to which the benefit is distributed by the administrator, the benefit account different from the payment account.

3. The computer-implemented method of claim 1, wherein the benefit account data includes a benefit account associated with the individual and to which the benefit is distributed by the administrator, and wherein the payment account transaction is directed to the benefit account, whereby the benefit account is also a payment account.

4. The computer-implemented method of claim 1, further comprising, prior to transmitting the proof-of-life validation for the individual to the identified administrator of the benefit, determining, by the server, that a proof-of-life validation for the individual has not already been transmitted to the identified administrator of the benefit within a current validation interval, whereby only one proof-of-life validation for the individual is transmitted to the identified administrator of the benefit during the current validation interval.

5. The method of claim 4, wherein the current validation interval is selected from the group consisting of a current benefit cycle and a number of days prior to a next benefit distribution date.

6. The computer-implemented method of claim 1, further comprising transmitting, by the server, the authorization request for the payment account transaction to an issuer associated with a payment account involved in the payment account transaction, and wherein the issuer is separate from the administrator.

7. The computer-implemented method of claim 6, further comprising:
receiving, by the server, a response to the authorization request for the payment account transaction from the issuer; and
transmitting, by the server, the response to the merchant, whereby the merchant is allowed to complete the payment account transaction with the individual based on the response.

8. The computer-implemented method of claim 7, wherein the payment device includes a payment card associated with the payment account.

9. The computer-implemented method of claim 7, wherein the server is associated with a payment service provider.

10. The computer-implemented method of claim 1, wherein the expiration interval is selected from the group consisting of a month, a number of days, a time between two consecutive benefit distribution dates, and a predetermined number of days before a benefit distribution date.

11. A system for use in verifying an individual prior to distribution of a benefit for the individual, the system comprising:
a processor associated with a payment service provider; and
a memory coupled to the processor, the memory including executable instructions, which when executed by the processor, cause the processor to:
receive an authorization request for a payment account transaction between an individual and a merchant, the payment account transaction involving a payment device associated with the individual;
identify, in the authorization request, a biometric status for the individual set in a field of the authorization request, the biometric status indicative of the payment account transaction being initiated by the individual within an expiration window of a match between a biometric received from the individual at the payment device and a reference biometric stored in the payment device, the authorization request not including actual biometric data of the individual;
extract, from the authorization request having the set biometric status, benefit account data for the individual;
identify an administrator of a benefit associated with the individual based on the extracted benefit account data; and
transmit a proof-of-life validation for the individual to the identified administrator of the benefit, thereby indicating to the administrator that the individual presented a valid biometric to the payment device, and whereby the administrator identifies the individual based on the benefit account data and relies on the proof-of-life validation to distribute the benefit for the individual.

12. The system of claim 11, wherein the payment account transaction is directed to a payment account; and
wherein the benefit account data includes a benefit account to which the benefit is distributed by the administrator, and wherein the benefit account is different from the payment account.

13. The system of claim 11, wherein the payment device includes a payment card associated with a payment account to which the payment account transaction is directed; and
wherein the executable instructions, when executed by the processor, further cause the processor to transmit the authorization request to an issuer associated with the payment account, wherein the issuer is separate from the administrator of the benefit.

14. The system of claim 13, wherein the executable instructions, when executed by the processor, further cause the processor to transmit an authorization reply to the merchant, as received from the issuer in response to the authorization request, the authorization reply either approving the payment account transaction or declining the payment account transaction regardless of whether, or not, the authorization request includes a set biometric status indicative of validation of a biometric associated with the individual.

15. The system of claim 11, wherein the executable instructions, when executed by the processor, further cause the processor, prior to transmitting the proof-of-life validation for the individual to the identified administrator of the benefit, to determine that a proof-of-life validation for the individual has not already been transmitted to the identified administrator of the benefit within a current validation interval, whereby only one proof-of-life validation for the individual is transmitted to the identified administrator of the benefit during the current validation interval.

16. The system of claim 15, wherein the current validation interval is selected from the group consisting of a current benefit cycle and a number of days prior to a next benefit distribution date.

17. A non-transitory computer readable storage medium including executable instructions for verifying an individual prior to distribution of a benefit for the individual, which when executed by at least one processor, cause the at least one processor to:
receive an authorization request for a payment account transaction between an individual and a merchant, the payment account transaction involving a payment device associated with the individual;
identify a biometric status as being set in a field of the authorization request, the biometric status indicative of the payment account transaction being initiated by the individual within an expiration window of a match between a biometric received from the individual at the payment device and a reference biometric stored in the payment device, the authorization request not including actual biometric data of the individual;

extract, from the authorization request having the set biometric status, benefit account data for the individual;
identify an administrator of a benefit associated with the individual based on the benefit account data extracted from the authorization request; and
transmit a proof-of-life validation for the individual to the identified administrator of the benefit, thereby indicating to the administrator that the individual presented a valid biometric to the payment device, and whereby the administrator identifies the individual based on the benefit account data and relies on the proof-of-life validation to distribute the benefit for the individual.

18. The non-transitory computer readable storage medium of claim 17, wherein the payment account transaction is directed to a payment account associated with the payment device; and
wherein the benefit account data includes a benefit account associated with the individual and to which the benefit is distributed by the administrator, the benefit account different from the payment account.

19. The non-transitory computer readable storage medium of claim 17, wherein the executable instructions, when executed by the at least one processor, further cause the at least one processor, prior to transmitting the proof-of-life validation for the individual to the identified administrator of the benefit, to determine that a proof-of-life validation for the individual has not already been transmitted to the identified administrator of the benefit within a current validation interval, whereby only one proof-of-life validation for the individual is transmitted to the identified administrator of the benefit during the current validation interval.

20. The non-transitory computer readable storage medium of claim 17, wherein the executable instructions, when executed by the at least one processor, further cause the at least one processor to:
transmit the authorization request for the payment account transaction to an issuer associated with a payment account involved in the payment account transaction, wherein the issuer is separate from the administrator;
receive a response to the authorization request for the payment account transaction from the issuer; and
transmit the response to the merchant, whereby the merchant is allowed to complete the payment account transaction with the individual based on the response.

* * * * *